(12) United States Patent
Debeneix et al.

(10) Patent No.: US 7,112,040 B2
(45) Date of Patent: Sep. 26, 2006

(54) METHOD OF GUIDING A BLADE HAVING A VARIABLE PITCH ANGLE

(75) Inventors: Pierre Debeneix, Saint Sauveur sur Ecole (FR); Alain Bromann, Valaines sur Seine (FR); Francois Buffenoir, Bretigny sur Orge (FR)

(73) Assignee: Snecma Moteurs, Paris (FR)

( * ) Notice: Subject to any disclaimer, the term of this patent is extended or adjusted under 35 U.S.C. 154(b) by 37 days.

(21) Appl. No.: 10/838,295

(22) Filed: May 5, 2004

(65) Prior Publication Data

US 2005/0008477 A1 Jan. 13, 2005

(30) Foreign Application Priority Data

Jun. 26, 2003 (FR) .................................. 03 07707

(51) Int. Cl.
*F01D 17/12* (2006.01)
(52) U.S. Cl. .................... 415/160; 415/229; 384/619
(58) Field of Classification Search ........ 415/159–165, 415/229, 230; 384/618, 619
See application file for complete search history.

(56) References Cited

U.S. PATENT DOCUMENTS

| 2,345,437 | A | * | 3/1944 | Tinker ...................... 384/619 |
| 2,778,564 | A | * | 1/1957 | Clarke et al. ............ 415/149.4 |
| 2,858,062 | A | * | 10/1958 | Allen ...................... 415/149.4 |
| 3,210,045 | A | * | 10/1965 | Lindquist ................... 415/164 |
| 3,674,377 | A |   | 7/1972 | Trappmann ................ 415/147 |

FOREIGN PATENT DOCUMENTS

GB           757230           9/1956

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A guide device for guiding a variable-pitch blade, in particular in a turbomachine compressor, the blade having a pivot formed by a cylindrical axial shank mounted in a cylindrical housing of a casing and pivotally guided about an axis in said housing by bearings, where the bearings are abutment bearings with conical rollers, the axes of the rollers being substantially perpendicular to the pivot axis of the blade.

21 Claims, 2 Drawing Sheets

METHOD OF GUIDING A BLADE HAVING A VARIABLE PITCH ANGLE

CROSS REFERENCE TO RELATED APPLICATIONS

This application is based upon and claims priority under 35 U.S.C. §119 from French Patent Application No. 0307707, filed Jun. 26, 2003.

BACKGROUND OF THE INVENTION

The present invention relates to a device for guiding a blade having a variable pitch angle, such as in particular a blade for directing air admitted into a turbomachine compressor, for example an aviation turbojet or turboprop.

Known guide devices enable the stator blades of a turbomachine to turn about their own axes so as to rectify the flow of gas that has been deflected by the rotor blades. By controlling the extent to which the gas flow is rectified, which is done as a function of the differing speeds of the machine and of the dynamic characteristics of the gas, it is possible to increase performance of a turbomachine.

In most designs, such as those described in documents FR-A-2 743 846, FR-A-2 814 206, and U.S. Pat. No. 5,215,434, such variable-pitch blades are guided in pivoting by bushings of antifriction material, e.g. sintered bronze, fixed in cylindrical bores machined in thickenings of a casing forming the stator of the turbomachine. The pivoting blades are held axially by washers made of a material similar to that of the bushings.

Those guide means generate an opposing torque that requires considerable force to be used to turn the blades, and they present a lifetime that is insufficient. In documents U.S. Pat. No. 3,674,377 and U.S. Pat. No. 2,778,377, proposals are made to replace them by ball bearings, roller bearings, or needle bearings, the axes of rotation of the rollers or the needles being parallel to the pivot axes of the blades. However, and even though the bearings used in those guides do indeed reduce the opposing torque acting against pivoting the blades, the solutions provided do not give entire satisfaction. When aerodynamic forces due to the flow of gas through the turbomachine act on the variable-pitch blades, the rolling elements (balls, needles, or rollers) in the bearings for guiding the blade are not loaded in uniform manner, i.e. some of the rolling elements are subjected to loads that are very high, while other elements are practically not loaded at all. As a consequence, wear on the rolling elements is not uniformly distributed, with highly loaded rolling elements wearing out much more quickly than rolling elements that are not loaded or that are lightly loaded, thereby leading to accelerated aging of the bearings which need to be monitored and changed regularly.

SUMMARY OF THE INVENTION

An object of the invention is to avoid the above-mentioned drawbacks and to provide a technically simple solution to the problem of guiding a blade pivot in its support by means of guidance that is reliable and of low friction and that enables the blade to be turned without force, avoiding premature wear of the rolling elements and reducing maintenance of the means for guiding the blade pivot.

The invention thus proposes a guide device for guiding a variable-pitch blade, in particular in a turbomachine compressor, the blade having a pivot formed by a cylindrical axial shank mounted in a cylindrical housing of a casing and pivotally guided about an axis in said housing by bearings, the device being characterized in that said bearings are abutment bearings with conical rollers, the axes of the rollers being substantially perpendicular to the pivot axis of the blade.

According to other characteristics of the invention, the guide device comprises two axially spaced apart abutment bearings with conical rollers, in each of which bearings the axes of rotation of the rollers lie in a common plane substantially perpendicular to the pivot axis of the blade.

Each roller abutment bearing comprises two annular rings with the rollers housed between them, each of which rings occupies a plane substantially perpendicular to the pivot axis of the blade.

The guide device includes means for clamping the conical rollers in each roller abutment bearing between the rings of the abutment bearing, the clamping direction being parallel to the pivot axis of the blade.

The static force clamping the rollers between the rings of a bearing is greater than the forces exerted on said rollers by the aerodynamic forces acting on the blade.

The roller abutment bearings, in which the axes of rotation of the rollers are perpendicular to the axis of rotation of the blade, can withstand high levels of radial loading, and above all very large axial loads, unlike needle bearings and roller bearings in which the axes of the needles and the rollers are parallel to the pivot axis of the blade, which bearings can withstand axial loads only when they are very small or practically zero. These characteristics of the device of the invention make it possible to apply an axial force on the roller abutment bearings, e.g. by means of a fixing nut that is tightened onto a threaded free end of the axial shank of the blade, which axial force is large, but without the bearing being damaged. Because of the conical shape of the rollers and of the surfaces of the abutment bearing rings that are in contact with the rollers, the axial force exerted by the nut on the abutment bearings is distributed over the rollers as axial and as radial prestress forces. The axial force exerted by the nut on the abutment bearings is determined so that the prestress forces exerted on the rollers are greater than the forces exerted on the rollers by the aerodynamic forces acting on the blade. By means of this axial tightening of the nut on the roller abutment bearings, the forces exerted while the turbomachine is in operation are distributed uniformly over all of the rollers, and this occurs regardless of the variations in the intensity and in the direction of the forces exerted on the blade by the gas. A direct consequence is that wear over time, in particular as a result of varying the pitch of the blade, is distributed uniformly over all of the rollers, thereby making it possible to increase the lifetime of the roller abutment bearings considerably and to decrease the frequency with which maintenance operations are needed to replace the abutment bearings. In addition, the roller abutment bearings used are of standard shapes and sizes, they do not require any special fabrication for the rings, and they are available from most bearing manufacturers at low cost.

The use of roller abutment bearings also makes it possible to obtain guidance of the pivoting of the blade in its support and enable the blade to be prevented from moving axially relative to the support in a manner that is substantially free from friction and that requires very little force to turn the blade. This reduction in force makes it possible to use blade drive means that are simpler and less expensive than those used in the prior art. These drive means may comprise, for example, links of the MIM type or single actuator controls.

Another advantageous characteristic of the invention is that the roller abutment bearings are leaktight, for example by using annular sealing plates fixed between the rings of the abutment bearings. In addition, in the invention, the abutment bearing that is closest to the blade is mounted in leaktight manner in the housing of the casing by having one of its rings bearing against a radial end surface of the blade, and the other one of its rings bearing against a radial surface of a shoulder formed in the housing of the casing. These sealing characteristics make it possible to isolate the internal mechanism of the turbomachine comprising specifically the rotor and the stator set of blades simply and effectively from the outside environment.

According to yet another characteristic of the invention:

a first abutment bearing bears via one of its rings against one end of the blade and via its other ring against a shoulder in the housing in the casing, and the other roller abutment bearing has one of its rings bearing against a shoulder in the housing in the casing, and has its other ring bearing against a clamping nut screwed onto the axial shank of the blade;

the abutment bearings are mounted in the housing of the casing on either side of a collar that projects into the inside of the housing, the radial surfaces of the collar forming the shoulders in the housing in the casing;

each abutment bearing includes an annular ring centered and fixed on the axial shank of the blade, and an annular ring centered and fixed in the housing of the casing;

the rings centered in the housing of the casing are the rings situated closest to each other, and the rings centered on the axial shank of the blade are those that are furthest apart from each other; and the rings centered in the casing are prevented from pivoting, and the rings centered on the axial shank are pivotally mounted.

BRIEF DESCRIPTION OF THE DRAWINGS

The invention will be better understood and other characteristics, details, and advantages thereof will appear more clearly on reading the following description made by way of example with reference to the accompanying drawings, in which.

DETAILED DESCRIPTION OF THE INVENTION

Figure 1:
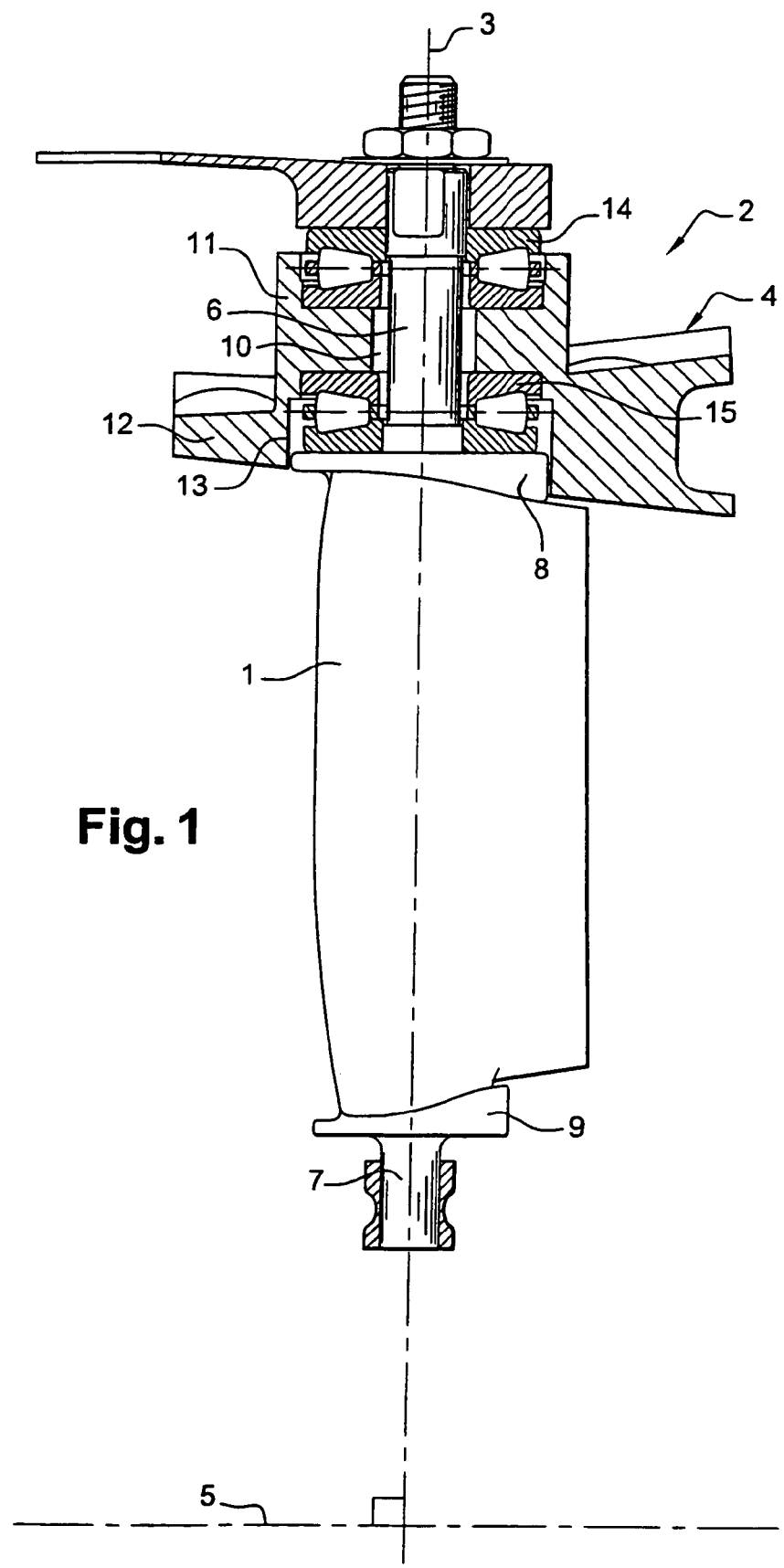
FIG. 1 is a diagrammatic section view of an embodiment of the device of the invention.
Figure 2:
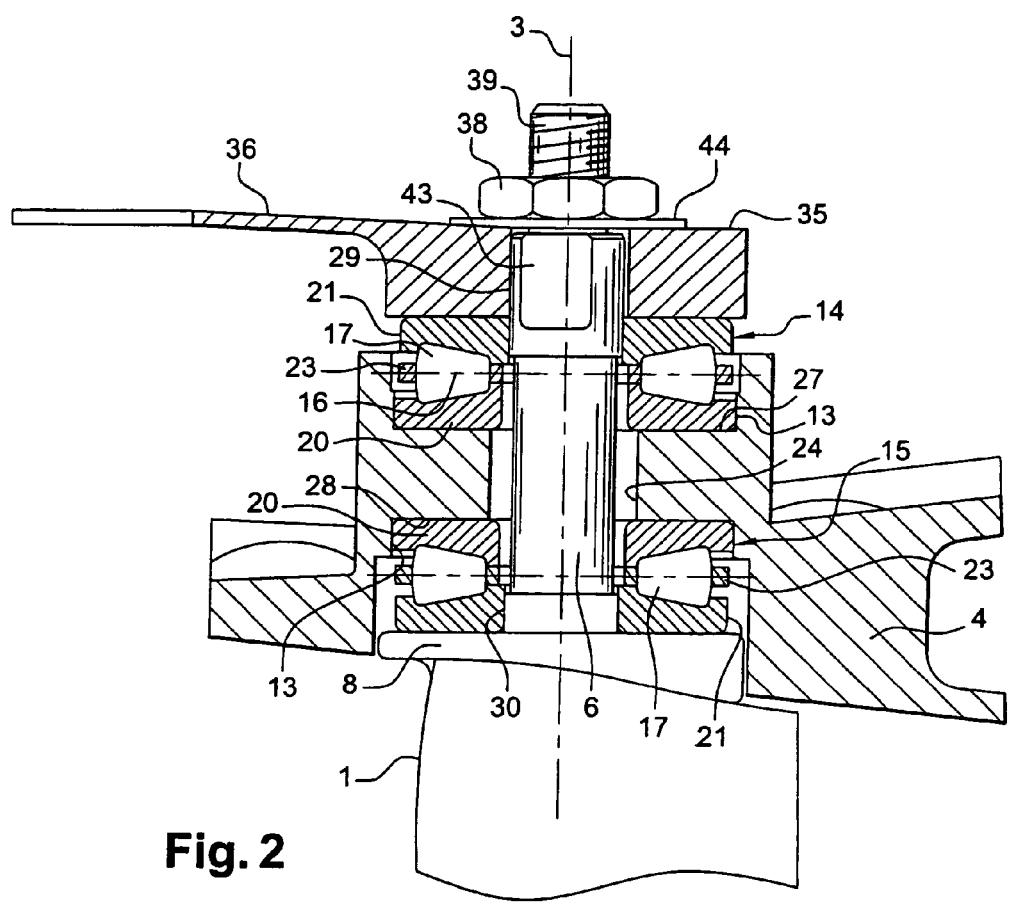
FIG. 2 is a view on a larger scale of a portion of the device shown in FIG. 1.

FIGS. 1 and 2 show a variable-pitch blade 1 in a compressor 2 of a turbomachine, the blade being capable of pivoting about its axis 3 relative to the stator 4 of the turbomachine. The axis 3 of the blade extends perpendicularly or otherwise relative to the axis of rotation 5 of the rotor (not shown) of the turbomachine. Two cylindrical pivots 6, 7 extend from the ends 8, 9 of the blade 1 along its pivot axis 3. The top pivot is formed by a cylindrical axial shank 6 of the blade 1 and is mounted in a cylindrical housing 10 formed in a thickening 11 of the stator 4, and the bottom pivot 7 extends from the other end 9 of the blade and is received in a cylindrical housing of a support (not shown) beside the rotor of the turbomachine. The axial shank 6 is guided in the cylindrical housing 10 of the stator 4 by a guide device of the invention. The guide device for the bottom pivot 7 is not shown in FIG. 1, such a device is not always needed to allow the blade 1 to pivot, and it may be a device that is already known in the prior art, e.g. as described in U.S. Pat. No. 2,778,564.

The thickening 11 in which the cylindrical housing 10 is formed extends perpendicularly or otherwise relative to the axis of rotation 5 of the rotor of the turbomachine on the radially outer surface of the stator 4. The cylindrical housing 10 has two cylindrical portions 13 at its ends of circular section and on a common axis that are separated by a collar 24 projecting into the inside of the housing 10. The axial shank 6 is centered and guided to pivot in the cylindrical housing 10 by two conical roller abutment bearings 14, 15 of dimensional and mechanical characteristics that are identical. The axes 16 of the rollers 17 in each abutment bearing 14, 15 lie in a common plane which is perpendicular to the pivot axis 3 of the blade 1. Each roller abutment bearing 14, 15 is mounted in a respective cylindrical end portion 13 on one side or the other of the collar 24. These roller abutment bearings 14, 15 are of standard type and each of them comprises two annular rings 20, 21 sharing a common axis and having the rollers 17 housed between them, each ring occupying a plane perpendicular to the pivot axis 3 of the blade 1. The rings 20 and 21 of each roller abutment bearing 14, 15 form annular paths for guiding the rollers 17 as they move when the blade 1 is pivoted. The rollers 17 placed in a circle between the rings 20 and 21 of each abutment bearing 14, 15 are held regularly spaced apart by means of a roller cage 23.

The collar 24 forms a projection from the inside wall of the cylindrical housing 10 around the pivot axis 3 of the blade 1. The roller abutment bearings 14, 15 are mounted on either side of the collar 24, and each of them bears axially against one of the radial surfaces 27, 28 of the collar 24 via one of its rings 20. Each roller abutment bearing 14, 15 is centered in the corresponding cylindrical portion 13 by its ring 20 bearing against the collar 24.

Each roller abutment bearing 14, 15 is also centered on a cylindrical bearing surface 29, 30 of the axial shank 6 of the blade by means of its ring 21 that is furthest from the collar. The two cylindrical bearing surfaces 29, 30 needed for centering the abutment bearings on the axial shank 6 are of the same diameter and they are made on a cylindrical portion of the axial shank having a diameter that is smaller than the diameter of the two cylindrical bearing surfaces.

The rings 20 centered in the portions 13 of the cylindrical housing 10 are prevented from rotating, while the rings 21 centered on the axial shank 6 of the blade are pivotal and constrained to pivot with the axial shank 6. The rings 20 centered in the portions 13 of the cylindrical housing 10 can be held by being a tight fit and/or by adhesive.

The roller abutment bearing 15 situated beside the blade 1 bears axially via its ring 21 centered on the shank 6 against the end 8 of the blade. The cylindrical bearing surface 30 enabling the roller abutment bearing 15 to be centered on the axial shank 6 extends from the end of the blade over a height that corresponds to the height of the ring 21.

The roller abutment bearing 14 situated beside the free end of the axial shank 6 bears axially via its ring 21 on an annular portion 35 of a lever 36 or a link for pivoting the blade, the annular portion 35 being engaged on the axial shank 6.

The annular portion 35 of the lever 36 or link is clamped axially, either directly or via a washer 44, against the abutment bearing 14 by means of a nut 38 screwed onto a threaded end 39 of the axial shank 6.

The annular portion 35 of the lever 36 has an internal cylindrical surface formed with at least one flat that cooperates with a corresponding flat 43 of the portion of the axial shank 6 about which it is engaged so as to lock the lever 36 to pivot with the blade 1.

In the embodiment shown, each roller abutment bearing 14, 15 is provided with two annular sealing plates (not shown) fixed between its two rings 20, 21, and it is leaktight.

In such an assembly, placing the two roller abutment bearings 14, 15 on either side of the collar 24 and placing the two roller abutment bearings 14, 15 between the end 8 of the blade and the clamping nut 38 makes it possible to prevent the axial shank 6, and consequently the blade 1, from moving in translation relative to the casing 4 of the turbomachine.

During assembly of the guide device, a final assembly step consists in tightening the fixing nut 38 on the axial shank 6 to a determined level of torque so as to prevent the blade 1 from moving in translation relative to the stator 4 and also so as to apply prestress on the rollers 17 of the abutment bearings 14, 15. Tightening the nut 38 generates compression forces which apply axially on each of the roller abutment bearings 14, 15 so as to clamp the rollers 17 between the rings 20, 21 of the abutment bearings. The roller abutment bearing 14 situated beside the free end of the axial shank 6 is then clamped between the annular portion 35 of the lever 36 and the collar 24, while the roller abutment bearing 15 situated beside the blade 1 is clamped between the end 8 of the blade and the collar 24.

Because of the conical shape of the rollers 17 and of the surfaces of the rings 20 and 21 in contact with the rollers 17, the compression forces exerted on each roller abutment bearing 14, 15 are distributed over the rollers 17 as axial and radial prestress forces. The clamping torque applied to the nut 38 screwed onto the axial shank 6 is determined so that the prestress forces exerted on the rollers 17 are considerably greater than the loads induced on the rollers 17 by the aerodynamic forces exerted on the blade 1 as a result of gas flowing through the turbomachine. Because of this prestress, the loads that are supported by the rollers 17 during operation of the turbomachine are continuously distributed uniformly over all of the rollers 17 regardless of variations in the intensity and the direction of the forces exerted on the blade 1 by the gas.

In a variant embodiment of the invention, the two roller abutment bearings 14, 15 are of dimensions and/or mechanical characteristics that are different.

The invention claimed is:

1. A guide device for guiding a variable-pitch blade, in particular in a turbomachine compressor, the blade having a pivot formed by a cylindrical axial shank mounted in a cylindrical housing of a casing and pivotally guided about an axis in said housing by bearings, wherein said bearings are abutment bearings with conical rollers, the rollers having rotation axes which are substantially perpendicular to the pivot axis of the blade, each roller abutment bearing comprises two annular rings with the rollers housed between them, each ring being in a plane substantially perpendicular to the pivot axis of the blade, and a first abutment bearing bears via one of its rings against one end of the blade and via its other ring against a shoulder in the housing in the casing, and the other roller abutment bearing has one of its rings bearing against a shoulder in the housing in the casing, and has its other ring bearing against a clamping nut screwed onto the axial shank of the blade.

2. A guide device according to claim 1, comprising two axially spaced apart abutment bearings with conical rollers, the rollers of each bearing having rotation axes which lie in a common plane substantially perpendicular to the pivot axis of the blade.

3. A guide device according to claim 1, including means for clamping the conical rollers in each roller abutment bearing between the rings of the abutment bearing, with a clamping direction which is parallel to the pivot axis of the blade.

4. A guide device according to claim 3, wherein the clamping force on the rollers of the abutment bearings is greater than the forces exerted on said rollers by the aerodynamic forces acting on the blade.

5. A guide device according to claim 1, wherein the abutment bearings are mounted in the housing of the casing on either side of a collar that projects into the inside of the housing, the radial surfaces of the collar forming the shoulders in the housing in the casing.

6. A guide device according to claim 1, wherein the first roller abutment bearing is mounted in leaktight manner in the housing of the casing, bearing via its rings against respective radial surfaces at the end of the blade and on a shoulder in the housing in the casing.

7. A guide device according to claim 1, wherein, in each roller abutment bearing, one annular ring is centered and fixed on the axial shank of the blade, and the other annular ring is centered and fixed in the housing of the casing.

8. A guide device according to claim 7, wherein the rings of the roller abutment bearings that are centered in the housing of the casing are the rings that are situated closer together, while the rings of the two roller abutment bearings that are centered on the axial shank of the blade are those that are further apart from each other.

9. A guide device according to claim 7, wherein the rings centered in the casing are prevented from pivoting, and the rings centered on the axial shank are pivotally mounted.

10. A guide device according to claim 1, wherein the roller abutment bearings are leaktight.

11. A compressor comprising the guide device for guiding a variable-pitch blade according to claim 1.

12. A turbomachine comprising the guide device for guiding a variable-pitch blade according to claim 1.

13. A guide device for guiding a variable-pitch blade comprising:
a blade having a pivot formed by a cylindrical axial shank mounted in a cylindrical housing of a casing; and
bearings configured to pivotally guide the blade about a pivot axis in said housing, said bearings being abutment bearings with conical rollers, the rollers having rotation axes which are substantially perpendicular to the pivot axis of the blade,
wherein each roller abutment bearing comprises two annular rings with the rollers housed between them, each ring being in a plane substantially perpendicular to the pivot axis of the blade, and a first abutment bearing bears via one of its rings against one end of the blade and via its other ring against a shoulder in the housing in the casing, and the other roller abutment bearing has one of its rings bearing against a shoulder in the housing in the casing, and has its other ring bearing against a clamping nut screwed onto the axial shank of the blade.

14. A guide device according to claim 13, wherein the abutment bearings are two axially spaced apart abutment bearings, and the rollers of each bearing have rotation axes which lie in a common plane substantially perpendicular to the pivot axis of the blade.

15. A guide device according to claim 13, further comprising:
   a clamp configured to hold the conical rollers in each roller abutment bearing between the rings of the abutment bearing, with a clamping direction being parallel to the pivot axis of the blade.

16. A guide device according to claim 15, wherein a clamping force on the rollers of the abutment bearings is greater than forces exerted on said rollers by aerodynamic forces acting on the blade.

17. A guide device according to claim 13, wherein the abutment bearings are mounted in the housing of the casing on either side of a collar that projects into the inside of the housing, the radial surfaces of the collar forming the shoulders in the housing in the casing.

18. A guide device according to claim 13, wherein the first roller abutment bearing is mounted in a leaktight manner in the housing of the casing, bearing via its rings against respective radial surfaces at the end of the blade and on a shoulder in the housing in the casing.

19. A guide device according to claim 13, wherein, in each roller abutment bearing, one annular ring is centered and fixed on the axial shank-of the blade, and an other annular ring is centered and fixed in the housing of the casing.

20. A guide device according to claim 19, wherein the rings of the roller abutment bearings that are centered in the housing of the casing are the rings that are situated closer together, while the rings of the two roller abutment bearings that are centered on the axial shank of the blade are those that are further apart from each other.

21. A guide device according to claim 19, wherein the rings centered in the casing are prevented from pivoting, and the rings centered on the axial shank are pivotally mounted.

* * * * *